United States Patent
Erickson et al.

(10) Patent No.: US 11,668,602 B2
(45) Date of Patent: Jun. 6, 2023

(54) SPATIAL OPTICAL EMISSION SPECTROSCOPY FOR ETCH UNIFORMITY

(71) Applicant: Applied Materials, Inc., Santa Clara, CA (US)

(72) Inventors: Blake Erickson, Gilroy, CA (US); Keith Berding, Truckee, CA (US); Michael Kutney, Santa Clara, CA (US); Zhaozhao Zhu, Milpitas, CA (US); Tsung Feng Wu, San Jose, CA (US); Michael D. Willwerth, Campbell, CA (US); Jeffrey Ludwig, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 14 days.

(21) Appl. No.: 17/234,940

(22) Filed: Apr. 20, 2021

(65) Prior Publication Data

US 2022/0333989 A1    Oct. 20, 2022

(51) Int. Cl.
  *G01J 3/32*   (2006.01)
  *G01J 3/02*   (2006.01)
  *G01N 21/25*  (2006.01)
  *G01N 21/68*  (2006.01)
  *G01N 21/95*  (2006.01)

(52) U.S. Cl.
  CPC ............. *G01J 3/32* (2013.01); *G01J 3/0291* (2013.01); *G01N 21/255* (2013.01); *G01N 21/68* (2013.01); *G01N 21/9501* (2013.01)

(58) Field of Classification Search
  CPC ......... H01J 2237/334; H01J 2237/3341; H01J 2237/3342; H01J 2237/3343; H01J 2237/3345; H01J 2237/3346; H01J 2237/3347; H01J 2237/3348; H01J 2237/3344; H01L 21/311; H01L 21/31105; H01L 21/31111; H01L 21/31116; H01L 21/31122; H01L 21/31127; H01L 21/31133; H01L 21/31138; H01L 21/31144
  See application file for complete search history.

(56) References Cited

U.S. PATENT DOCUMENTS

| | | | |
|---|---|---|---|
| 2008/0099435 A1* | 5/2008 | Grimbergen | H01J 37/32963 216/60 |
| 2008/0099436 A1* | 5/2008 | Grimbergen | H01J 37/32963 216/60 |
| 2008/0176149 A1* | 7/2008 | Grimbergen | C23F 4/00 216/60 |
| 2013/0157387 A1* | 6/2013 | Chen | H01L 21/31116 156/345.25 |
| 2015/0168130 A1* | 6/2015 | Matsudo | H01J 37/32642 374/161 |
| 2021/0125814 A1* | 4/2021 | Sato | C23C 16/50 |

* cited by examiner

*Primary Examiner* — Dominic J Bologna
(74) *Attorney, Agent, or Firm* — Lowenstein Sandler LLP (57) ABSTRACT

An apparatus includes a base component and collimators housed within the base component. The collimators correspond to collection cylinders for sampling optical emission spectroscopy (OES) signals with respect to locations of a wafer in an etch chamber. The apparatus further includes a guide, operatively coupled to the plurality of collimators, to guide the sampling of the OES signals along paths for sampling the OES signals.

18 Claims, 6 Drawing Sheets

SPATIAL OPTICAL EMISSION SPECTROSCOPY FOR ETCH UNIFORMITY

TECHNICAL FIELD

The present disclosure relates generally to electronic device fabrication, and, more particularly, relate to spatial optical emission spectroscopy (OES) for etch uniformity.

BACKGROUND

Manufacturing systems produce products based on manufacturing parameters. For example, substrate processing systems produce substrates based on the many parameters of process recipes. Products have performance data based on what parameters were used during production. Etch process equipment can be used to remove material from areas of a substrate through, e.g., chemical reaction and/or physical bombardment. For example, vacuum etch processes can use plasma to generate gas-phase reactants. During etch processing, an etch rate refers to a rate of material removal, and etch selectivity refers to a ratio of etch rates observed in two materials. There can be a plurality of materials of interest during etch. Such materials include: (1) a target material to be etched; (2) a material underneath the target material; (3) a mask material; and (4) adjacent material to the target material that may be exposed to the etch processing (e.g., process gas).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, an apparatus includes a base component and a plurality of collimators housed within the base component. The plurality of collimators corresponds to a plurality of collection cylinders for sampling optical emission spectroscopy (OES) signals with respect to a plurality of locations of a wafer in an etch chamber. The apparatus further includes a guide, operatively coupled to the plurality of collimators, to guide the sampling of the plurality of OES signals along a plurality of paths for sampling the plurality of OES signals.

In another aspect of the disclosure, a system includes a memory, and a processing device operatively coupled to the memory. The processing device is to facilitate an etch rate uniformity monitoring processing by performing a plurality of operations including initiating an iteration of an etch process to etch a wafer using an etch recipe, receiving an analysis of a plurality of optical emission spectroscopy (OES) signals sampled during the iteration of the etch process with respect to a plurality of locations of the wafer, and performing one or more actions related to etch uniformity based on the analysis of the plurality of OES signals.

In yet another aspect of the disclosure, a method includes initiating, by a processing device, an iteration of an etch process to etch a wafer using an etch recipe, receiving, by the processing device, an analysis of a plurality of optical emission spectroscopy (OES) signals sampled during the iteration of the etch process with respect to a plurality of locations of the wafer, and performing, by the processing device, one or more actions related to etch uniformity based on the analysis of the plurality of OES signals.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments described herein relate to optical emission spectroscopy (OES) for etch uniformity. As etch process recipes are being developed to achieve a desired etch pattern, methods of obtaining feedback are limited. For example, methods of obtaining feedback include: (1) external metrology with wafers; (2) external metrology with coupons; (3) single point in-situ reflectometry; and (4) ellipsometry.

To perform external metrology with wafers, wafers with films of materials of interest can be premeasured with an ellipsometer or other external metrology. Wafers can be etched with a proposed etch process and then re-measured with external metrology. Etch selectivity can then be determined by comparing wafers with films of different materials.

To perform external metrology with coupons, similar to external metrology with wafers, coupons with films of materials of interest are placed on a wafer. Each coupon can be baselined for film thickness with an ellipsometer or other external metrology. Selectivity can be determined by comparing etch rates of each material.

To perform single point in-situ reflectometry, a wafer or coupon on a carrier is measured in-situ with single point reflectometry, which is used to monitor etch rate during the etch process. Etch selectivity can then be determined by measuring each coupon/wafer separately. This method can require one wafer or one coupon on a wafer, and one process per material.

With respect to ellipsometry, an in-situ ellipsometer can be added onto the etch chamber to measure a spot adjacent to the spot measured by reflectometry. The ellipsometer can be bulky and difficult to align, can require chamber modification, and the measurement method is different and must be calibrated. It is practically limited to allow only one additional measurement point.

OES can provide valuable information about the gases present and chemical byproducts generated during a plasma etch process. Etch chambers can be outfitted with an optical signal collection device coupled to a spectrometer via optical channels (e.g., fiber optic cables). The spectrometer can identify specific wavelength photons that are uniquely emitted from specific materials when excited in a radio frequency (RF) generated plasma. A port or window may be located on the side of the etch chamber to sample the global optical emission from the chamber. However, this provides little to no information regarding the spatial intensity of the emission.

To address these and other limitations, the embodiments described herein provide for a system that permits OES spatial sampling within an etch chamber. For example, some embodiments described herein can use multiple collimators to strategically sample photons from various paths in an etch chamber to identify spatial variations during an etch process using an etch recipe that can impact etch uniformity on a wafer. In addition, some embodiments described herein can develop and/or optimize the etch recipe for etch uniformity and/or for monitoring etch uniformity drifts as the etch chamber changes over RF hours.

The spatial OES system can include a spatial OES sampling apparatus. In some embodiments, the spatial OES sampling apparatus can include a number of collimators each corresponding to a collection cylinder for sampling OES signals along different paths above a wafer in the etch chamber. In some embodiments, the collimators can be positioned above the top/center window and point to particular locations above the wafer. For example, the locations above the wafer can include a center of the wafer, locations along an inner ring of the wafer (referred to herein as the "wafer middle"), and locations along an outer ring of the wafer (referred to herein as the "wafer edge"). Any suitable number of sampling paths can be obtained in accordance with the embodiments described herein. For example, in some embodiments, 7 collimators corresponding to 7 collection cylinders can be provided, with one collection cylinder directed to the wafer center, three collection cylinders directed to the wafer middle, and three collection cylinders directed to the wafer edge. The collimators may not need to be positioned above the top/center window, and can be positioned in any suitable configuration in accordance with the embodiments described herein.

The spatial OES system can further include an etch uniformity monitoring sub-system. Each of the OES signals collected by the spatial OES sampling apparatus can be transmitted by a corresponding optical channel (e.g., fiber optic cable) from each of the collimators to the etch uniformity monitoring sub-system for monitoring etch uniformity. More specifically, the etch uniformity monitoring sub-system can include at least one optical detector (e.g., spectrometer) for performing an optical analysis (e.g., spectroscopic analysis) on the OES signals to analyze, e.g., intensity and/or wavelength. For example, each of the OES signals can be sent to a switch device (e.g., a multiplexer) to route each of the OES signals to a single optical detector. As another example, each of the OES signals can be sent to its own optical detector, without requiring a switch device. The results of the optical analysis can be used by a processing device of the etch uniformity monitoring sub-system to further develop and/or optimize an etch recipe for etch uniformity.

Embodiments described herein advantageously overcome the limitations of other measurement techniques by providing "in-situ" feedback on etch uniformity with correlation to external metrology. Additionally, time to develop etch recipes in the lab can be improved.

Figure 1:
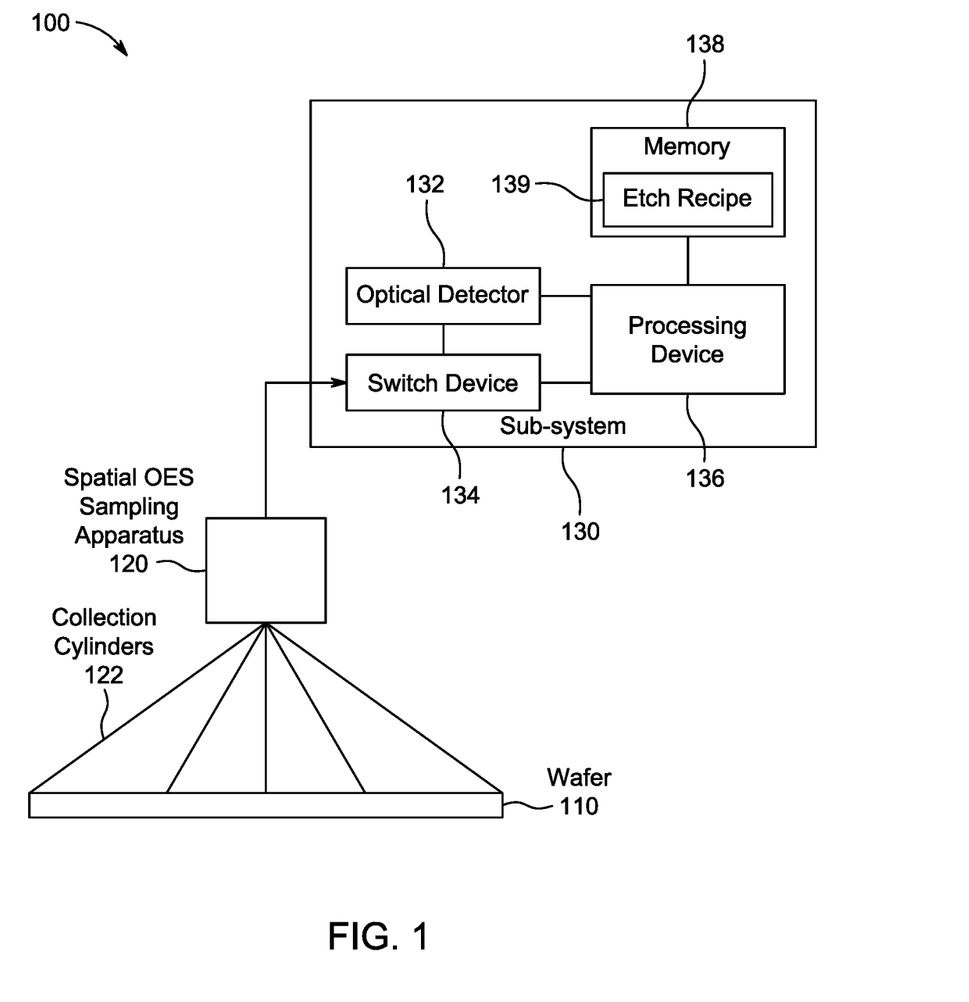
FIG. 1 is a block diagram illustrating a high-level overview of a spatial optical emission spectroscopy (OES) system for etch uniformity monitoring, according to some embodiments.

FIG. 1 is a diagram of a high-level overview of a spatial optical emission spectroscopy (OES) system 100 for etch uniformity. More specifically, as will be described in further detail below, the system 100 can implement spatial OES with multiple OES signals to analyze etch uniformity with respect to a plasma etch process performed in an etch chamber, and can be used to develop and/or optimize an etch recipe based on results of the analysis. As shown, the system 100 includes a wafer 110, a spatial OES sampling apparatus ("apparatus") 120 and an etch uniformity monitoring sub-system ("sub-system") 130. The wafer 110 can be placed on an electrostatic chuck or other suitable apparatus (not shown) to secure the wafer 110 within the etch chamber.

As will be described in further detail below with reference to FIG. 2, the apparatus 120 supports a number of collimators (not shown) arranged in a variety of directions and/or angles to perform spatial OES sampling at respective locations on the wafer 110 during the iteration of the etch process. More specifically, each of the collimators corresponds to a collection cylinder, such as the collection cylinder 122, for sampling OES signals at different locations above the wafer 110 each corresponding to a sampling point. As will be described in further detail below with reference to FIGS. 2-3, the collimators can be arranged with a base component (not shown) of the apparatus 120 with respect to different radii of the wafer 110. In some embodiments, the apparatus 120 supports 7 collimators corresponding to 7 collection cylinders. As will be further described below with reference to FIGS. 2-4, the apparatus 120 can further include a guide (not shown) that is designed to guide the sampling of the OES signals along the respective paths for collecting a number of different OES zones (e.g., 7 OES zones).

The sub-system 130 includes at least one optical detector 132 operatively coupled to a switch device 134, a processing device 136 operatively coupled to the components 132 and 134, and a memory device 138 operatively coupled to the processing device 136. In some embodiments, the optical detector 132 is a spectrometer.

The processing device 136 can be used to initiate an iteration of an etch process using an etch recipe 139 stored in the memory 138. More specifically, the etch recipe 139 can be a plasma etch recipe. The etch recipe 139 has etch recipe conditions (e.g., gas type, gas concentration, pressure, power, pulsing, etc.) that control the etch effect on the materials during the iteration of the etch process initiated by the processing device 136.

The OES signals sampled during the iteration of the etch process can be routed via optical channels (e.g., a bundle of fiber optic cables) to the switch device 134 to distribute and route the OES signals to the optical detector 132. In some embodiments, the switch device is a multiplexer. More specifically, the switch device 134 can switch individual optical channels (e.g., fibers) to be sampled by the optical detector 132 in series for performing spectroscopy on the OES signals. However, in alternative embodiments, a number of optical detectors can be used in place of the switch device 134, such that each optical channel is coupled to a corresponding optical detector.

The processing device 136 can further analyze the OES signals sampled by the collection cylinders (e.g., collection cylinder 122) to monitor and/or control etch uniformity. More specifically, the etch rate can be measured by the processing device 136 using a model based on the OES signals. The processing device 136 can then optimize and/or maintain etch uniformity based on the measurements (e.g., using suitable machine learning techniques), which can be used to further develop and/or optimize the etch recipe 139 for etch uniformity.

Figure 2:
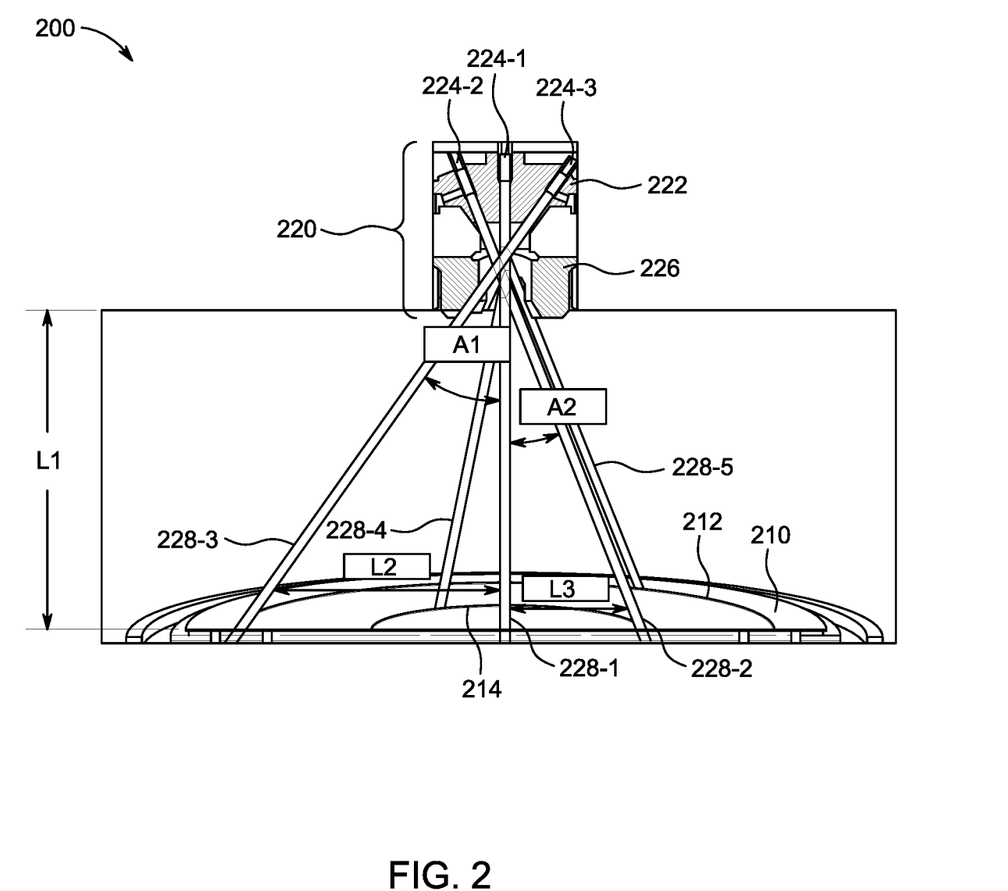
FIG. 2 is a diagram of a portion of a spatial optical emission spectroscopy (OES) sampling system, according to some embodiments.

FIG. 2 illustrates a portion of a spatial optical emission spectroscopy (OES) sampling system ("system") 200, according to some embodiments. More specifically, the system 200 can be implemented within an etch chamber to monitor etch uniformity. As shown, the system includes a wafer 210 being etched and a spatial OES sampling apparatus ("apparatus") 220.

The wafer 210 can include any suitable material that can be etched by a plasma etch process. Examples of materials include, but are not limited to, oxides, nitrides, polysilicon, and photoresists. As show, the wafer 210 includes an inner ring 212 corresponding to the wafer middle and an outer ring 214 corresponding to the wafer edge. More specifically, the outer ring 214 can be as far from the wafer center as possible to perform spatial OES sampling.

The apparatus 220 includes a base component 222 housing a number collimators including collimators 224-1 through 224-3, and a guide 226. Each of the collimators corresponds to a collection cylinder. For example, the collimator 224-1 corresponds to a collection cylinder 228-1, the collimator 224-2 corresponds to a collection cylinder 228-2, and the collimator 224-3 corresponds to a collection cylinder 228-3. Another collimator (not shown) corresponds to a collection cylinder 228-4.

The guide 226 is designed to point the collection cylinders to respective locations on the wafer 210 for spatial OES sampling. For example, if there are 7 collimators configured to generate 7 collection cylinders, one of the collection cylinders can be pointed to the center of the wafer 210, three of the collection cylinders can be pointed to respective locations along the outer ring 212 and three of the collection cylinders can be pointed to respective locations along the inner ring 214. For example, in this illustrative example, the collection cylinder 228-1 is pointed to the center of the wafer 210, the collection cylinders 228-2 and 228-4 are pointed to respective locations along the inner ring 214, and collection cylinders 228-3 and 228-5 are pointed to respective locations along the outer ring 212. It may be desirable for this group of 3 collection cylinders to provide a similar result, as this means that the impact of the process on the wafer 210 is symmetric around the center of the wafer 210. If the behavior is not similar, it indicates skew. Thus, by having 3 collection cylinders in the wafer middle and the wafer edge, skew can be assessed.

In some embodiments, the guide 226 has a length of between about 20 mm and about 30 mm. More specifically, the guide 226 can have a length of, e.g., about 25.7 mm.

Near the guide 226, each of the collection cylinders pass through a similar zone, but diverge as they go toward their respective locations above the wafer 210. The distance between the guide 226 and the wafer 210, "L1," can be determined based on the desired radii/diameters of the outer ring 212 and the inner ring 214, as well as the respective locations that the collimators are pointed to along the outer ring 212 and the inner ring 214. In some embodiments, L1 is between about 147 mm and about 157 mm. More specifically, L1 can be, e.g., about 152.4 mm (6.00 inches). In some embodiments, a distance between the collection cylinder 228-1 and the collection cylinder 228-3, "L2," is between about 120 mm and about 130 mm, and a distance between the collection cylinder 228-1 and the collection cylinder 228-2, "L3," is between about 63 mm and about 73 mm. More specifically, L2 can be, e.g., about 125 mm and L3 can be, e.g., about 68 mm. In some embodiments, an angle between the collection cylinder 228-1 and the collection cylinder 228-3, "A1," is between about 30° and about 40°, and an angle between the collection cylinder 228-1 and the collection cylinder 228-2, "A2," is between about 16° and about 26°. More specifically A1 can be, e.g., about 35° and A2 can be, e.g., about 21°.

If the etch process is more aggressive in one radial zone on the wafer than another, then a higher concentration of byproducts may be in the plasma and more photons would be collected by the collimator pointed in that direction. By normalizing the data relative to a starting condition, non-uniformity due to other factors such as channel (e.g., fiber) transmission or alignment can be subtracted out.

The system 200 can detect OES spatial differences due to etch recipe inputs. More specifically, as will be described in further detail below with reference to FIGS. 3-4, a number of scallops can be built into the guide 226 for guiding the sampling of the OES signals along the respective paths with respect to the outer ring 212 and the inner ring 214. The collection cylinder 228-1 can be directed above the center of the wafer 210 without a scallop through the opening of the guide 226. Moreover, the apparatus 200 can include an optical port or window (not shown) to allow the multiple collimators (e.g., 7 collimators) to collect the optical signals from the various locations above the wafer 210.

Due to the geometric limitations in the collection cylinders, it may be observed that the "edge" pointed cylinders are longer than the "center" cylinder, which may have an impact on the relationship between etch rate and sensor signals. This difference can be accounted for using machine learning through system training.

Figure 3:
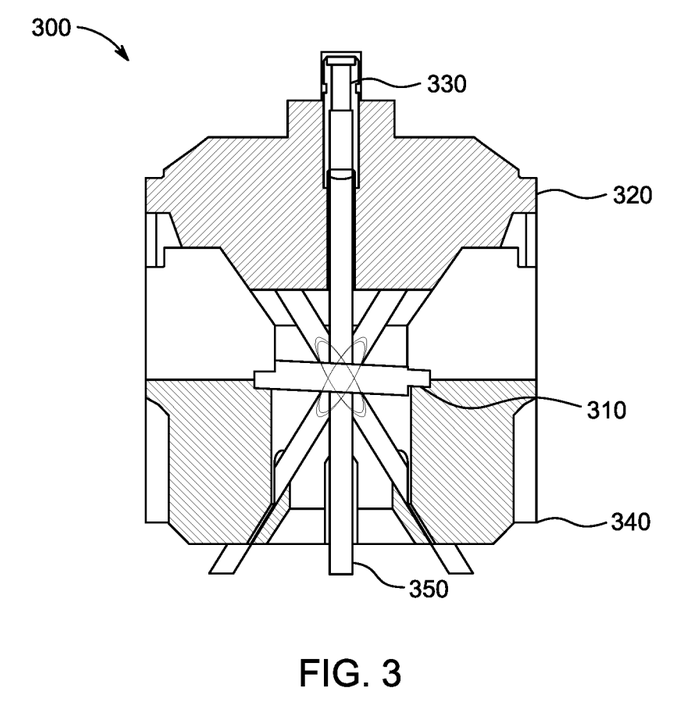
FIG. 3 is a diagram illustrating a spatial optical emission spectroscopy (OES) sampling apparatus of a spatial OES sampling system, according to some embodiments.

FIG. 3 illustrates a spatial OES sampling apparatus ("apparatus") 300 of a spatial OES sampling system, according to some embodiments. The apparatus 300 is similar to the apparatus 200 described above with reference to FIG. 2.

As shown, the apparatus 300 includes an optical port 310, a base component 320, a number of collimators including a collimator 330, a guide 340, and multiple collection cylinders corresponding to respective ones of the multiple collimators, including a collection cylinder 350 corresponding to the collimator 330. As described above with reference to FIG. 2, the optical port 310 can be a window to allow the multiple collimators (e.g., 7 collimators) to collect optical signals along various paths with respect to the wafer (e.g., the wafer center, an inner ring corresponding to the wafer middle, and an outer ring corresponding to the wafer edge). That is, the multiple collection cylinders pass through the optical port 310 at different angles to capture photons for OES analysis. As mentioned above with reference to FIG. 2 and as will be described in further detail below with reference to FIGS. 4A and 4B, respective scallops built into the guide 340 can be used to guide the sampling of the OES signals along the respective paths with respect to the wafer.

Figure 4A:
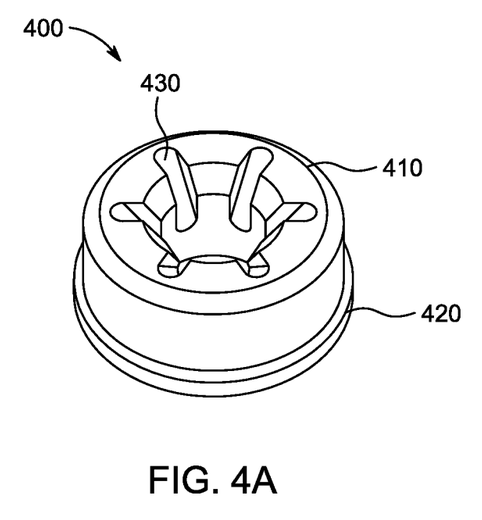
FIGS. 4A-4B are diagrams of a guide used within a spatial sampling apparatus, according to some embodiments.
Figure 4B:
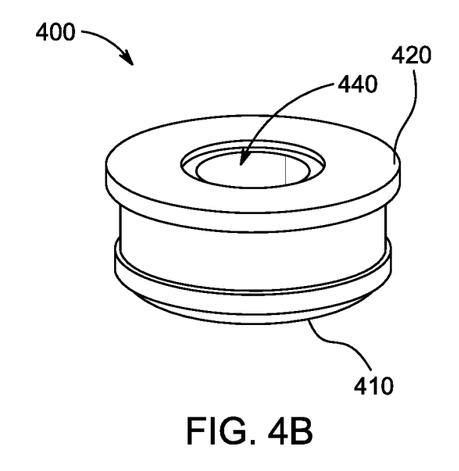

FIGS. 4A and 4B illustrate respective perspective views of a guide 400, according to some embodiments. The guide 400 can be used within a spatial OES sampling apparatus, as described above with reference to FIGS. 1-3. As shown, the guide 400 has a top surface 410, a bottom surface 420, a number of scallops 430, and an opening 440. The scallops 430 guide the sampling of the OES signals along respective paths with respect to a wafer. In this illustrative example, the guide 400 has 6 scallops 430, such that the guide 400 can support 7 collection cylinders for enabling collection of optical signals from 7 different OES zones.

Figure 5:
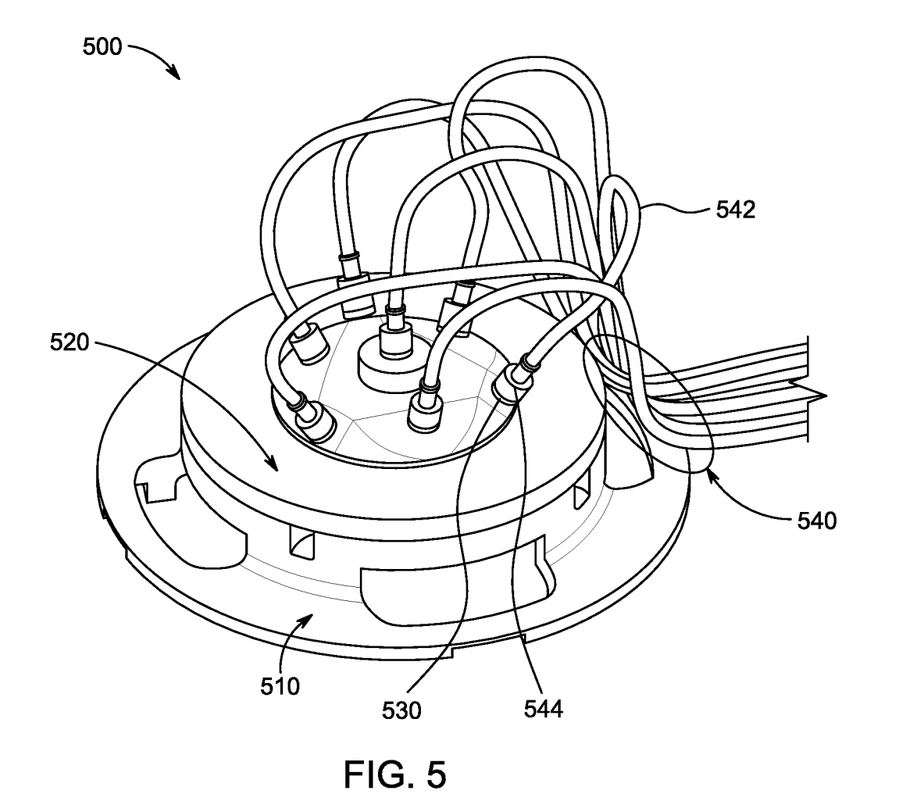
FIG. 5 is a diagram of a base component of a spatial optical emission spectroscopy (OES) sampling apparatus, according to some embodiments.

FIG. 5 illustrates an example base component 500 of a spatial OES sampling apparatus ("apparatus"), such as the apparatus 200 of FIG. 2 and the apparatus 300 of FIG. 3. As shown, the base component 500 includes an upper clamp 510, a base 520, and multiple ports including port 530. As further shown in this example, a set of optical channels 540 including an optical channel 542 is secured to the upper clamp 510. Collimators are attached to respective ends of the optical channels of the set 540, such as a collimator 544 attached to an end of the optical channel 542. Each collimator is inserted into a respective port (e.g., the collimator 544 is inserted into the port 530). As described herein above, each collimator corresponds to a collection cylinder for sampling OES signals from a corresponding location above a wafer. In this illustrative example, there are 7 ports and 7 collimators, with one collimator corresponding to a collection cylinder located above the center of the wafer, three collimators corresponding to three collection cylinders located at respectively positions above an inner ring of the wafer (the wafer middle), and three collimators corresponding to three collection cylinders located at respectively positions above an outer ring of the wafer (the wafer edge).

Figure 6:
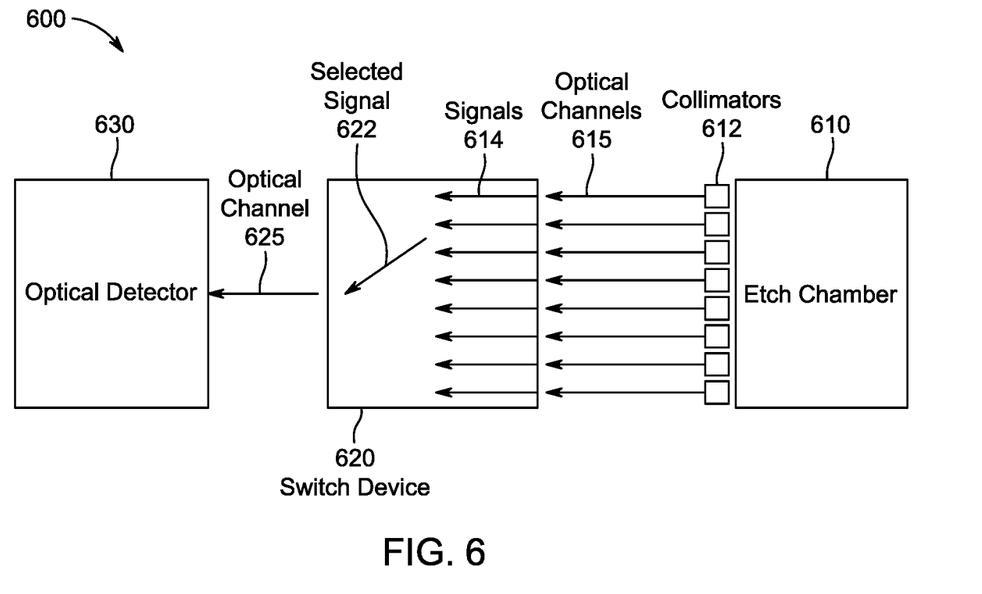
FIG. 6 is a diagram of an etch uniformity monitoring sub-system, according to some embodiments.

FIG. 6 is a diagram of a system 600 including an etch uniformity monitoring sub-system ("sub-system"), according to some embodiments. As shown, the system 600 includes an etch chamber 610, a switch device 620 (e.g., a multiplexer), and an optical detector 630 (e.g., spectrometer).

A number of collimators 612 are operatively coupled to the etch chamber 610. Each collimator corresponds to a collection cylinder for collecting optical emission signals ("signals") 614, and the number of collimators 612 can be equal to the number of signal measurement locations with respect to a wafer in the etch chamber 610. For example, the collimators 612 can be located above the wafer to collect signals 614 from respective locations above the wafer. In this illustrative embodiment, there are seven collimators corresponding to seven locations with respect to the wafer. The signals 614 can be sent to a switch device 620 via respective optical channels 615 (e.g., fiber optic cables). The switch device 620 can select one of the signals 614 at a time as a selected signal 622 to be sent to the optical detector 630 via an optical channel 625 for analysis. In alternative embodiment, instead of having the switch device 620, each of the signals 614 can be sent to a respective optical detector.

Figure 7:
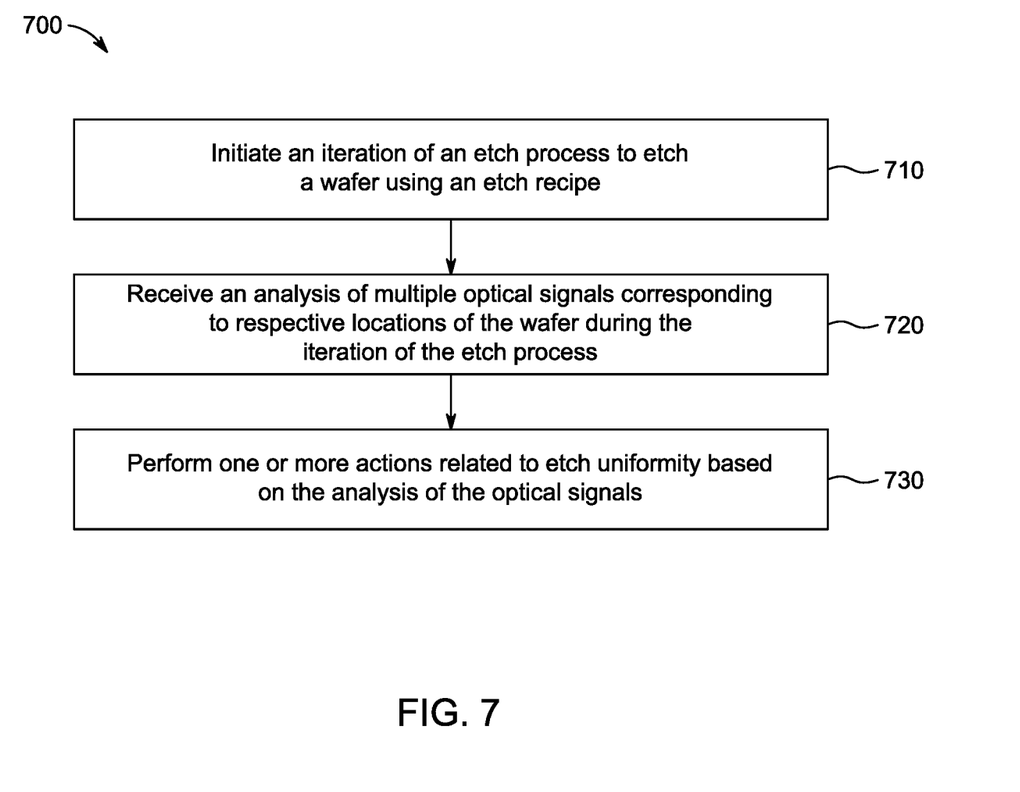
FIG. 7 is a flow diagram of a method to implement spatial optical emission spectroscopy (OES) for etch uniformity, according to some embodiments.

FIG. 7 is a flow diagram of a method 700 to implement spatial optical emission spectroscopy (OES) for etch uniformity, according to some embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the processing device 136 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 710, the processing logic initiates an iteration of an etch process to etch a wafer using an etch recipe. In some embodiments, the processing logic can initiate the iteration of the etch process in response to receiving a request to initiate the iteration of the etch process. For example, the processing logic, after receiving the request, can cause the exposure of the multiple materials to etchants as determined by the etch recipe. The thickness of one or more of the materials can decrease over time as a result of the etch recipe being used.

The etch process can be a plasma etch process. The etch recipe has etch recipe conditions (e.g., gas type, gas concentration, pressure, power, pulsing, etc.) that control the etch effect on the materials during the iteration of the etch process.

At block 720, processing logic receives an analysis of multiple optical signals corresponding to respective locations of the wafer during the iteration of the etch process. More specifically, the multiple optical signals can be optical emission spectroscopy (OES) signals. For example, the analysis can determine etch rates with respect to each location. In some embodiments, multiple collection cylinders can be pointed at the respective locations of the wafer for sampling respective ones of the optical signals, with each of the collection cylinders corresponding to a collimator attached to an optical channel (e.g., a fiber optic cable). An optical channel (e.g., fiber optic cable) connected to each collimator can be used to transmit an optical signal to an optical detector (e.g., spectrometer) to perform the analysis (e.g., spectroscopy). In some embodiments, the optical signals are routed to a single optical detector using a switch device (e.g., multiplexer). In other embodiments, each optical signal can be directly routed to a corresponding optical detector.

At block 730, the processing logic performs one or more actions related to etch uniformity based on the analysis of the optical signals. For example, etch rates determined by the analysis can be used to measure etch uniformity with respect to the various locations of the wafer. For example, radial and/or skew etch uniformity can be measured.

The one or more actions can include optimizing the etch recipe for etch uniformity. For example, the processing logic can implement any suitable machine learning technique to determine which output results in a uniform etch process, and then etch recipe options can be developed to achieve etch uniformity. Accordingly, etch recipe quality can be improved.

The one or more actions can include monitoring etch uniformity. For example, etch uniformity can be monitored by the processing logic as a function of RF hours. In some embodiments, a baseline of what is uniform in production can be established, and the etch uniformity can be monitored to identify the existence of etch uniformity drift.

The one or more actions can include controlling etch uniformity. For example, the processing logic can control etch uniformity by changing etch recipe inputs to achieve desired OES outputs (e.g., OES intensity). This can be implemented by an automatic control system for maintaining etch rates and etch uniformity by changing equipment inputs.

The method 700 can be used to analyze the effect that different environmental conditions have on OES parameters with respect to the center, middle, and edge locations of a wafer being etched. For example, the method 700 can be used to analyze the effect of RF ratio (Ra) on OES intensity with respect to the center, middle and edge locations of a wafer being etched. In some implementations, the method 700 can be used to analyze the effect of Ra between inner and outer coils on OES intensity using 7 collection cylinders. In this case, the 3 middle ring points, and 3 edge ring points can be averaged to provide one value for center, middle, edge. It can be shown that higher Ra can result in lower OES signal for all locations, higher Ra can cause higher change in the center than the edge, and as Ra increases, edge intensity can increase. As another example, the method 700 can be used to analyze the effect of pressure on OES intensity with respect to the center, middle and edge locations of a wafer being etched. It can be shown that pressure decreases OES intensity but impacts the center more than the edge.

The method 700 can be further used to analyze etch rate as a function of OES parameters with respect to the center, middle and edge locations of a wafer being etched. For example, the spatial OES method can be used to analyze normalized etch rate as a function of normalized OES intensity with respect to the center, middle and edge locations of a wafer being etched. It can be shown that there is a direct relationship between OES intensity and etch rate, and that etch rate can be highest at the edge locations and lowest at the center location. Further details regarding the method 700 are described above with reference to FIGS. 1-6.

Figure 8:
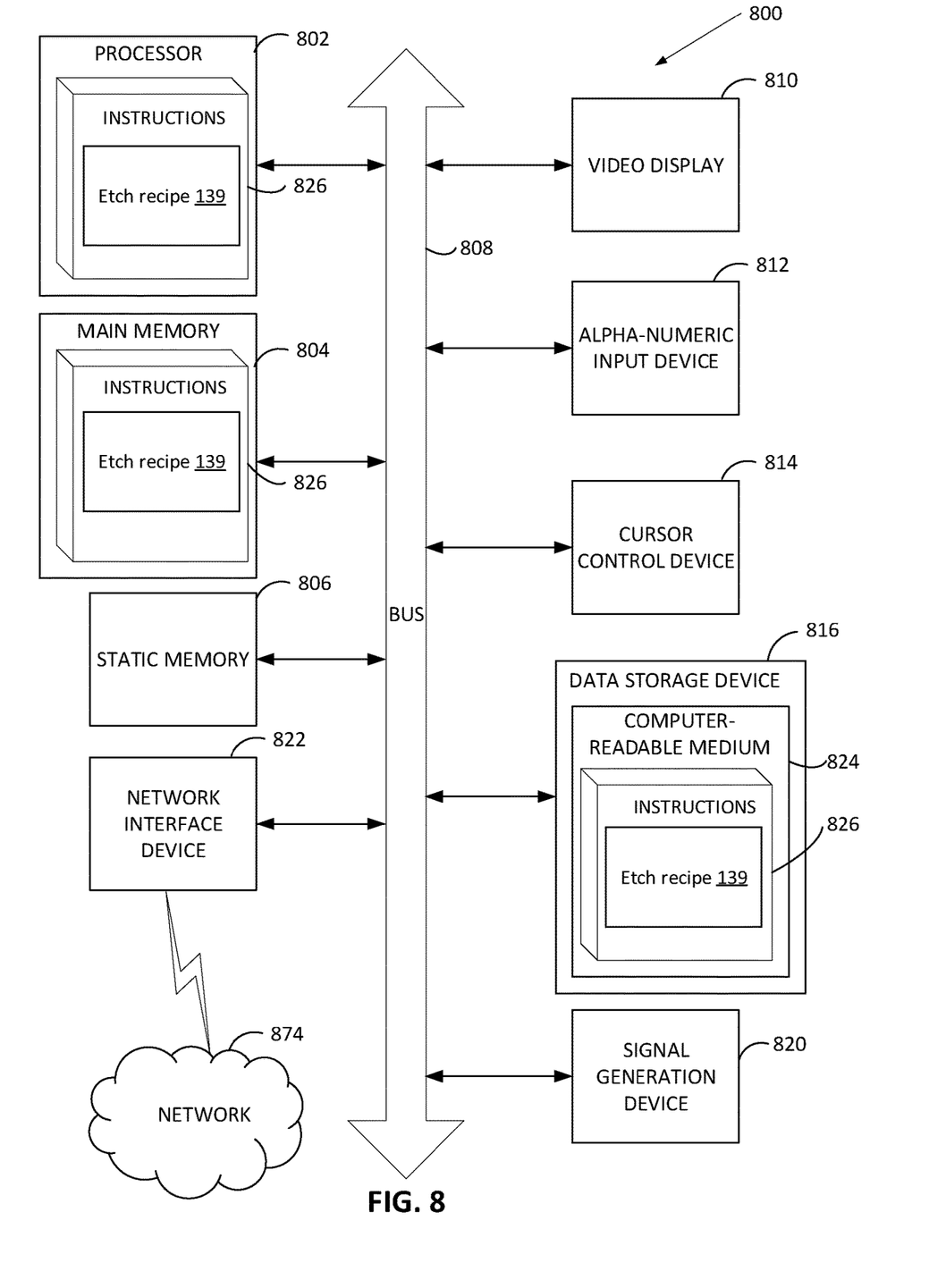
FIG. 8 is a block diagram illustrating a computer system, according to some embodiments.

FIG. 8 is a block diagram illustrating a computer system 800, according to certain embodiments. In some embodiments, the computer system 800 is one or more of client device or server.

In some embodiments, computer system 800 is connected (e.g., via a network, such as a Local Area Network (LAN), an intranet, an extranet, or the Internet) to other computer systems. In some embodiments, computer system 800 operates in the capacity of a server or a client computer in a client-server environment, or as a peer computer in a peer-to-peer or distributed network environment. In some embodiments, computer system 600 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 includes a processing device 802, a volatile memory 804 (e.g., Random Access Memory (RAM)), a non-volatile memory 806 (e.g., Read-Only Memory (ROM) or Electrically-Erasable Programmable ROM (EEPROM)), and a data storage device 816, which communicate with each other via a bus 808.

In some embodiments, processing device 802 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 800 further includes a network interface device 822 (e.g., coupled to network 874). In some embodiments, computer system 800 also includes a video display unit 810 (e.g., an LCD), an alphanumeric input device 812 (e.g., a keyboard), a cursor control device 814 (e.g., a mouse), and a signal generation device 820.

In some implementations, data storage device 816 includes a non-transitory computer-readable storage medium 824 on which store instructions 826 encoding any one or more of the methods or functions described herein. For example, the instructions 826 can include the etch recipe component 139 of FIG. 1, which, when executed, can implement a method for etch uniformity monitoring, such as the method 700 of FIG. 7.

In some embodiments, instructions 826 also reside, completely or partially, within volatile memory 804 and/or within processing device 802 during execution thereof by computer system 800, hence, in some embodiments, volatile memory 804 and processing device 802 also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "training," "identifying," "further training," "re-training," "causing," "receiving," "providing," "obtaining," "optimizing," "determining," "updating," "initializing," "generating," "adding," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

The methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. An apparatus comprising:
a base component;
a plurality of collimators housed within the base component, each collimator of the plurality of collimators corresponding to a respective collection cylinder of a plurality of collection cylinders for collecting a plurality of optical emission spectroscopy (OES) signals with respect to a plurality of locations of a wafer in an etch chamber to perform spatial OES, wherein the plurality of locations comprises a center location of the wafer, a plurality of inner ring locations along an inner ring of the wafer, and a plurality of outer ring locations along an outer ring of the wafer; and
a guide, operatively coupled to the plurality of collimators, to guide each OES signal of the plurality of OES signals along a respective path of a plurality of paths for sampling the plurality of OES signals, wherein the plurality of paths comprises a first set of radially symmetric paths with respect to the inner ring and a second set of radially symmetric paths with respect to the outer ring.

2. The apparatus of claim 1, wherein the guide comprises a plurality of scallops.

3. The apparatus of claim 1, wherein the inner ring comprises 3 inner ring locations and the outer ring comprises 3 outer ring locations, and the plurality of collimators comprises 7 collimators.

4. The apparatus of claim 1, wherein the base component comprises:
an upper clamp for securing a set of optical channels, wherein each collimator of the plurality of collimators is attached to a respective end of an optical channel of the set;
a base; and
a plurality of ports formed within the base, wherein each collimator of the plurality of collimators is inserted into a respective port of the plurality of ports.

5. A system comprising:
a spatial optical emission spectroscopy (OES) apparatus comprising:
a guide to guide each OES signal of a plurality of OES signals along a respective path of a plurality of paths during an iteration of an etch process to etch a wafer using an etch recipe with respect to a plurality of locations of the wafer, wherein the plurality of locations comprises a center location of the wafer, a plurality of inner ring locations along an inner ring of the wafer, and a plurality of outer ring locations along an outer ring of the wafer, and wherein the plurality of paths comprises a first set of radially symmetric paths with respect to the inner ring and a second set of radially symmetric paths with respect to the outer ring; and
an optical detector to generate a spatial OES analysis based on a sampling of the plurality of OES signals;
a memory; and
a processing device operatively coupled to the memory and the spatial OES apparatus, the processing device to facilitate an etch rate uniformity monitoring process by performing a plurality of operations comprising:
initiating the iteration of the etch process to etch the wafer using the etch recipe;
receiving, from the spatial OES apparatus, the spatial OES analysis of the plurality of OES signals; and
performing one or more actions related to etch uniformity based on the spatial OES analysis.

6. The system of claim 5, wherein the spatial OES sampling apparatus further comprises:
a plurality of collimators operatively coupled to the guide, each collimator of the plurality of collimators corresponding to a respective collection cylinder of a plurality of collection cylinders.

7. The system of claim 5, wherein the processing device is operatively coupled to a switch device to enable the plurality of OES signals to be selectively analyzed with the optical detector.

8. The system of claim 5, wherein the spatial OES analysis determines etch rates with respect to each location of the plurality of locations.

9. The system of claim 5, wherein performing the one or more actions comprises optimizing the etch recipe for etch uniformity.

10. The system of claim 5, wherein performing the one or more actions comprises monitoring etch uniformity.

11. The system of claim 5, wherein performing the one or more actions comprises controlling etch uniformity.

12. The system of claim 5, wherein the inner ring comprises 3 inner ring locations and the outer ring comprises 3 outer ring locations.

13. A method comprising:
initiating, by a processing device, an iteration of an etch process to etch a wafer using an etch recipe with respect to a plurality of locations of the wafer, wherein the plurality of locations comprises a center location of the wafer, a plurality of inner ring locations along an inner ring of the wafer, and a plurality of outer ring locations along an outer ring of the wafer;
receiving, by the processing device, a spatial optical emission spectroscopy (OES) analysis of a plurality of spatial OES signals sampled during the iteration of the etch process with respect to the plurality of locations of the wafer, and wherein the plurality of signals comprises a first set of signals sampled radially symmetric with respect to the inner ring and a second set of signals sampled radially symmetric with respect to the outer ring; and
performing, by the processing device, one or more actions related to etch uniformity based on the spatial OES analysis.

14. The method of claim 13, wherein the spatial OES analysis determines etch rates with respect to each location of the plurality of locations.

15. The method of claim 13, wherein performing the one or more actions comprises optimizing the etch recipe for etch uniformity.

16. The method of claim 13, wherein performing the one or more actions comprises monitoring etch uniformity.

17. The method of claim 13, wherein performing the one or more actions comprises controlling etch uniformity.

18. The method of claim 13, wherein the inner ring comprises 3 inner ring locations and the outer ring comprises 3 outer ring locations.

\* \* \* \* \*